(No Model.)
J. Q. ADAMS.
CULTIVATOR.
No. 266,066.
2 Sheets—Sheet 1.
Patented Oct. 17, 1882.
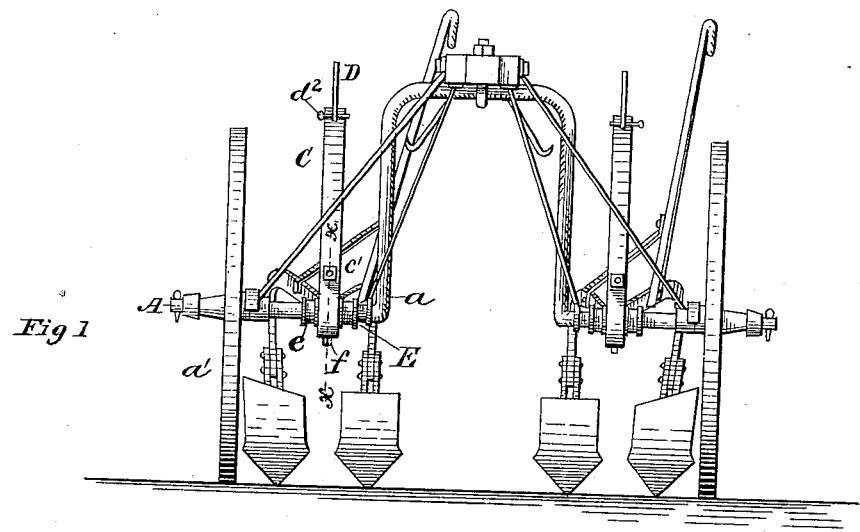
Fig 1
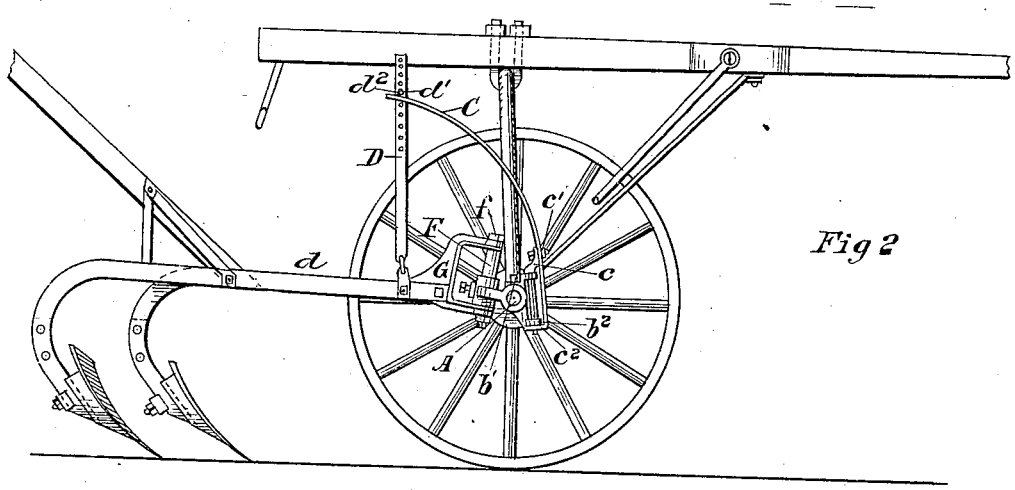
Fig 2
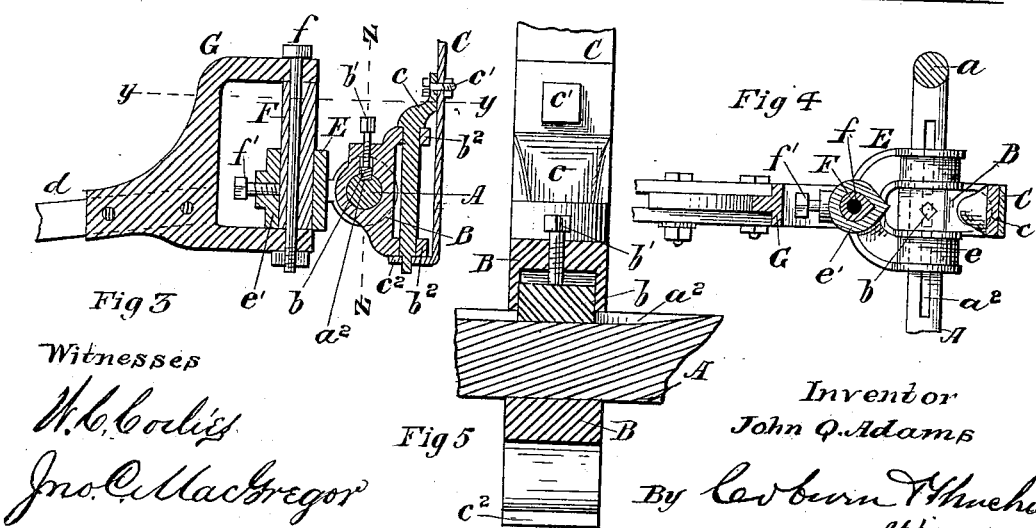
Fig 3
Fig 5
Fig 4
Witnesses
W. C. Corliss
Jno. C. MacGregor
Inventor
John Q. Adams
By Coburn & Thacher
Attorneys (No Model.)　　　　　　　J. Q. ADAMS.　　　　2 Sheets—Sheet 2.
CULTIVATOR.

No. 266,066.　　　　　　　　　　　　Patented Oct. 17, 1882.

Witnesses　　　　　　　　　　　　Inventor
　　　　　　　　　　　　　　　　　John Q. Adams
　　　　　　　　　　　　By Coburn & Thacher
　　　　　　　　　　　　　　　　　Attorneys

UNITED STATES PATENT OFFICE.

JOHN Q. ADAMS, OF MARSEILLES, ILLINOIS.

CULTIVATOR.

SPECIFICATION forming part of Letters Patent No. 266,066, dated October 17, 1882.

Application filed November 16, 1881. (No model.)

*To all whom it may concern:*

Be it known that I, JOHN Q. ADAMS, of Marseilles, in the county of La Salle and State of Illinois, have invented certain new and useful Improvements in Cultivators, which are set forth in the following specification, reference being had to the accompanying drawings, in which—

Figure 6:
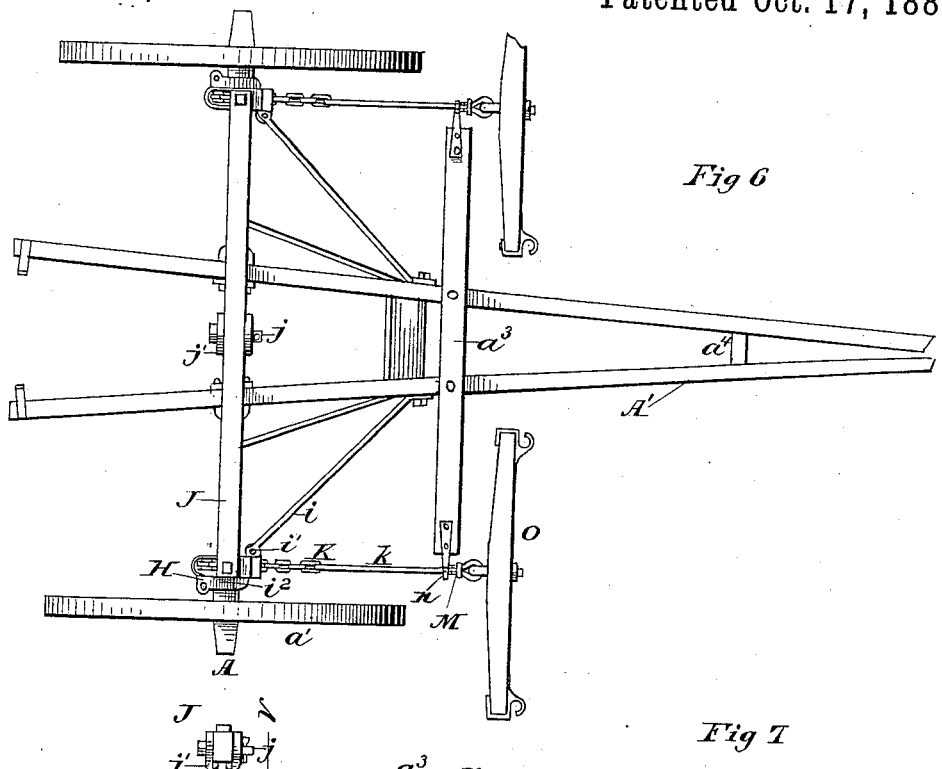
Figure 7:
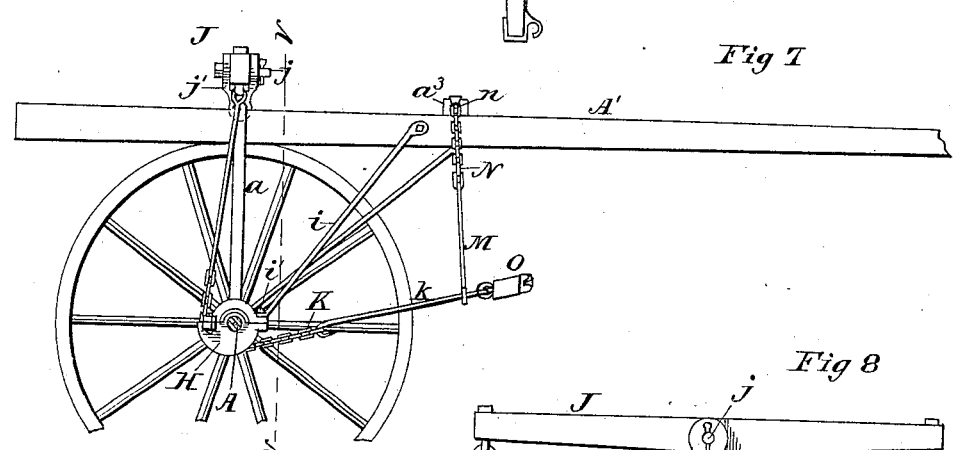
Figure 8:
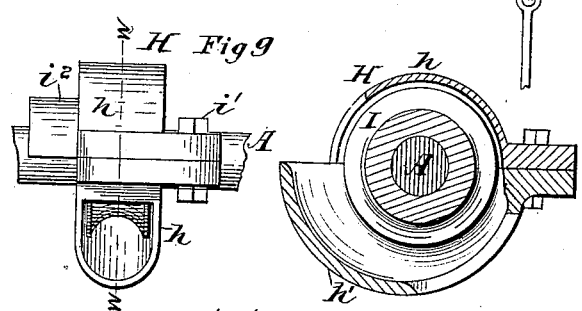
Figure 8:
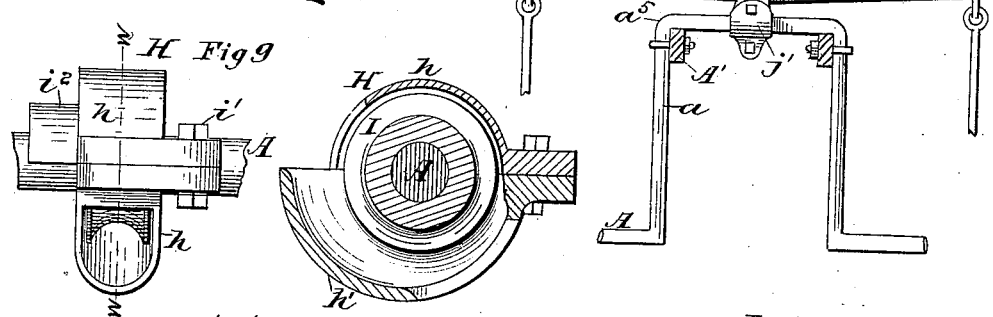

Figure 1 represents a cultivator embodying such of my improvements as relate to the cultivator-beams or their springs; Fig. 2, a side elevation of the same with one wheel removed; Fig. 3, a vertical detail section of the same on an enlarged scale, showing the axle and adjacent parts; Fig. 4, a section of the same taken on the line $y\,y$ of Fig. 3, and Fig. 5 a section of the same taken on the line $z\,z$ of Fig. 3. Fig. 6 is a plan view of a cultivator, showing the evener and draft-regulating device; Fig. 7, a side elevation of the same with one wheel removed; Fig. 8, a detail section of the same, taken on the line $v\,v$ of Fig. 7; Fig. 9, an end elevation of the same, showing the sheave-block; and Fig. 10, a longitudinal section of the same, taken on the line $w\,w$ of Fig. 9.

My invention relates to wheel-cultivators.

It consists in certain devices by means of which the cultivator-beams are attached to the axle, whereby a ready vertical adjustment of the forward end of the beam is obtained and a lateral adjustment of the coupling device on the axle.

It also consists in the arrangement and attachment of the beam-spring, whereby it is preserved in substantial alignment with the beam.

My invention consists, still further, of certain devices for regulating the draft.

I will proceed to describe in detail the construction and operation of the several devices by means of which my improvements may be embodied in a working-cultivator, and will then point out more definitely in the claims the special improvements which I believe to be new, and which I wish to secure by Letters Patent.

In the drawings, A represents the axle of the cultivator. A' is the branching pole, with its regulator-bar $a^3$ and cross-piece $a^4$. J is the evener, mounted on a pivot, $j$, parallel with the pole, in a bracket, $j'$, secured to the arch $a$ of the axle.

As the other parts of the cultivator embodying my improvements are in duplicate, one set being on each side of the cultivator, I will describe particularly only the improvements on one side.

Between the arch of the axle and the wheel $a'$ the axle has a spline-groove, $a^2$, by means of which and the key-block or spline $b$, which is confined in the spline-groove by the set-screw $b'$, the bracket B is secured so as to be incapable of either lateral or rotary motion. The arms $b^2$ of this bracket are bored for the reception of the bolt $c$, which acts as a pivot to provide for the lateral oscillation of the spring C, to which it is attached by the screw-bolt $c'$ after the reamed heel $c^2$ of the spring C has been drawn over the projecting lower end of the bolt $c$.

In the upper end of the spring C is a slot, through which rides up and down the connecting-rod D, on which is suspended the cultivator-beam $d$. This rod D is perforated at intervals, and through one of the holes, $d'$, thus formed the pin $d^2$ is inserted above the spring C.

On the axle is sleeved the forked link or beam-coupler E, one fork $e$ being on each side of the bracket B. At its outer end this link is thickened in bosses above and below, to form the sleeve $e'$ of wedge-shaped cross-section in its bore. This sleeve sheathes the spindle F, which spindle is somewhat freely adjustable therein, has its cross-section a counterpart thereto, and is secured at the proper level therein by the set-screw $f'$, pressing the wedge-shaped side of the spindle F into the corresponding part of the sleeve $e'$, and thus wedging the spindle in the sleeve. The spindle F is itself sleeved on the pivot-pin $f$, and is coextensive with the span of the yoke or clevis G of the cultivator-beam, through the ends of which yoke the pin $f$ is inserted.

On the end of the axle next to the wheel are clamped, by bolting together, the two parts $h\,h'$ of a sheave-block, H. This sheave-block incloses the sheave I, which is sleeved on the axle so as to rotate freely. To this sheave-block may be secured the outer brace, $i$, by means of the forward clamping-bolt, $i'$, and also the dust-guard $i^2$, as shown in the drawings. The sheave-block arches over the sheave to hold the chain thereon when the latter is slack, the block of course being cut away to admit of the free passage of the chain when the latter is subjected to tension.

The vibration of the evener is limited by the corners $a^5$ of the arch of the axle. To each end of this evener is secured a chain, K, which passes under the sheave I and terminates in a rod-link, $k$, which is supported by and slides through a loop in the end of the rod M, which is hung by a link of the chain N to the hook $n$ of the regulator-bar $a^3$. On the end of the rod-link $k$ is hung the whiffletree O by a loop on said rod-link $k$, which loop secures said rod-link $k$ within its own supporting-loop.

The operation of my invention is as follows: By the construction of the bracket B and adjacent parts I am enabled easily to release and move the bracket, even on a partially-grooved axle, to any desired distance from its counterpart bracket, or entirely off from the axle, for repairs, &c., while at the same time the bracket is susceptible of the most secure fastening. The spring C is to assist the operator in holding the shovels at the proper level, the bolt $c$ allowing the spring to accommodate itself to the lateral deviation of the cultivator-beam. The rod D may be pinned up to any desired height by the use of the graduated series of holes $d'$. The link E provides for both vertical and lateral oscillation or deviation of the cultivator-beams without permitting the shovels or the handles to tip sidewise, the link being closely sleeved on at different points of the axle by the two forks of the link, and in order to attain this end, and at the same time provide for the adjustment of the shovels at different depths, or at different degrees of inclination, the pivot $f$ is arranged in connection with the spindle F and sleeve $e'$, with the set-screw $f'$, the spindle fitting somewhat loosely in the sleeve to facilitate vertical adjustment, and at the same time being capable of the most secure fastening to the sleeve, when adjusted, by the set-screw $f'$ wedging the spindle F into the wedge-shaped cavity of the sleeve.

As it is frequently necessary to make the shovels swerve considerably and at once, and as they are, as compared with the length of the sleeve, a great distance from the handles, a slight rocking of the clevis by reason of the looseness of its pivot would admit of a great lower sidewise rocking or tipping of the cultivator proper, and would necessitate a much longer side thrust of the handle by the operator than is required when there is no tipping at the vertical pivot. The bracket B serves as a collar for the link E. By making an angle in the line of draft by which the leverage for pulling down the pole is reduced or changed to a leverage with the opposite tendency, as shown, I am enabled to place the evener out of the way of the crop without at the same time making any downdraft, except such as may be desired to keep the poll from vibrating up and down by reason of the pressure of the cultivators proper on the springs which balance them. This action is facilitated by carrying the draft-chains around the axle over a sheave considerably larger than the axle, for the pull on the chains when taut will have a tendency to turn the axle upward, and as the pole is rigidly attached to the arch and braced to the axle this effect will in turn tend to lift the pole. The chains N, which can be vertically adjusted by changing the link which is secured to the hook $n$, are for obtaining the desired downdraft.

Having thus described my invention, what I claim as new, and desire to secure by Letters Patent, is—

1. In a cultivator, the axle provided with a longitudinal groove, a forked beam-coupler mounted loosely on the axle, a bracket also mounted loosely on the axle between the forks of the coupler, and provided with an interior chamber, a spline-block set loosely in the chamber over the axle-groove, and a setting device for forcing the spline down into the groove and firmly holding it in place, substantially as and for the purposes set forth.

2. In a cultivator, the shovel-beam connected to the axle by a double-jointed coupling, permitting both vertical and lateral movement of the beam, in combination with a vertical pivot secured to the axle at or near the pivotal coupling of the shovel-beam, and a spring secured at one end to said vertical pivot extending upward and backward and connected at its other end to the shovel-beam, substantially as and for the purposes set forth.

3. The shovel-beam connected to the axle by a double-jointed coupling, in combination with the bracket attached to the axle substantially in line with the vertical pivot of the beam-coupling, a vertical pivot-bolt mounted on the bracket, and the spring attached at one end to the pivot-bolt so as to turn with it and at the other end connected to the beam back of its coupling, substantially as and for the purposes set forth.

4. The bracket B, provided with projections $b^2$, the pivot-bolt $c$, mounted on the bracket, with its bearings in the projections, and the beam-lifting spring C, having the bend $c^2$ at its extremity, which receives the projecting lower end of the pivot-bolt, and fastened rigidly to said bolt at a point above the lower bearing thereof, substantially as and for the purposes set forth.

5. The axle A, in combination with the beam $d$, connected to the axle by a double-jointed coupling, the bracket B, the spring C, pivoted to the bracket substantially in line with the vertical beam-pivot and extended back over the beam, and the rod D, connecting the rear end of the spring to the beam, substantially as and for the purposes set forth.

6. The vertical pivot-pin $f$ of the beam-coupling, in combination with the spindle F, sleeved thereon and provided with a wedge-shaped enlargement or rib on one side, and the sleeve $e'$ of the coupling-link, the opening in which conforms to the wedging shape of the spindle that is received therein, substantially as and for the purposes set forth.

7. The coupling-sleeve $e'$, the opening of which is V-shaped on one side, in combination with the spindle F, having a wedge-shaped rib on one side formed to fit the V-shaped opening of the sleeve, the pivot-pin $f$, the set-screw $f'$, and the beam-clevis G, substantially as described.

8. The axle A, in combination with the sheaves I, mounted and turning on the axle, the block H, inclosing the sheaves, and provided with openings in front and rear for the draft-chains, and the draft-chains K, substantially as described.

JOHN Q. ADAMS.

Witnesses:
C. M. BENSON,
O. R. ADAMS.